US007868896B1

(12) United States Patent
Datta Roy et al.

(10) Patent No.: US 7,868,896 B1
(45) Date of Patent: Jan. 11, 2011

(54) METHOD, APPARATUS, AND COMPUTER-READABLE MEDIUM FOR UTILIZING AN ALTERNATE VIDEO BUFFER FOR CONSOLE REDIRECTION IN A HEADLESS COMPUTER SYSTEM

(75) Inventors: Sandip Datta Roy, Lilburn, GA (US); Sivaprasath Swaminathan, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 603 days.

(21) Appl. No.: 11/103,820

(22) Filed: Apr. 12, 2005

(51) Int. Cl.
*G09G 5/39* (2006.01)
*G06F 15/16* (2006.01)
*G06F 15/173* (2006.01)

(52) U.S. Cl. ............... 345/531; 345/503; 709/217; 709/238; 709/240; 709/242

(58) Field of Classification Search ......... 345/503, 345/531; 709/217, 238, 240, 242
See application file for complete search history.

(56) References Cited

U.S. PATENT DOCUMENTS

| 4,278,973 | A | * | 7/1981 | Hughes et al. ............. 345/26 |
| 4,757,441 | A | * | 7/1988 | Buckland et al. ........... 345/503 |
| 5,675,363 | A | * | 10/1997 | Omori ..................... 345/544 |
| 5,708,820 | A | * | 1/1998 | Park et al. ................ 713/323 |
| 5,726,680 | A | * | 3/1998 | Paley et al. ............... 345/589 |
| 5,737,769 | A | * | 4/1998 | Kim ....................... 711/202 |
| 5,751,979 | A | * | 5/1998 | McCrory .................. 715/803 |
| 5,878,248 | A | * | 3/1999 | Tehranian et al. ........... 345/502 |
| 5,953,746 | A | * | 9/1999 | Crocker et al. ............. 711/173 |
| 5,960,464 | A | * | 9/1999 | Lam ....................... 711/206 |
| 5,978,912 | A | * | 11/1999 | Rakavy et al. .............. 713/2 |
| 6,049,871 | A | * | 4/2000 | Silen et al. ................ 713/2 |
| 6,108,748 | A | * | 8/2000 | Ofek et al. ................ 711/112 |
| 6,192,455 | B1 | * | 2/2001 | Bogin et al. .............. 711/154 |
| 6,219,695 | B1 | * | 4/2001 | Guttag et al. ............. 709/217 |
| 6,477,642 | B1 | * | 11/2002 | Lupo ...................... 713/2 |
| 6,721,868 | B1 | * | 4/2004 | Natu et al. ................ 711/202 |
| 6,732,159 | B1 | * | 5/2004 | Levine et al. ............. 709/217 |
| 6,748,423 | B1 | * | 6/2004 | Khanna et al. ............ 709/210 |

(Continued)

OTHER PUBLICATIONS

IBM Personal System/2 Model 80 Technical Reference, First Edition (Apr. 1987), pp. 4-19-4-57.

(Continued)

*Primary Examiner*—Daniel Washburn
(74) *Attorney, Agent, or Firm*—Hope Baldauff Hartman, LLC (57) ABSTRACT

Methods, systems, apparatus, and computer-readable media are provided for utilizing an alternate video buffer for console redirection in a headless computer system. According to the method, a buffer is created in the main memory of the computer that is configured to store character and attribute data for a display of the computer. When a video services software interrupt is detected, the interrupt is trapped. A determination is then made as to whether a function associated with the interrupt is for writing to a video display memory. If the function is for writing, the contents of the buffer are updated with the character or attribute information specified by the function. Data representing the updated character or attribute is then redirected to the remote computing device. If a read function is encountered, character or attribute information is retrieved from the buffer at a specified location and is returned in response to the function call.

14 Claims, 6 Drawing Sheets

U.S. PATENT DOCUMENTS

| | | | |
|---|---|---|---|
| 6,904,458 B1 * | 6/2005 | Bishop et al. | 709/223 |
| 7,124,226 B2 * | 10/2006 | Khanna | 710/300 |
| 7,145,576 B2 * | 12/2006 | Emerson et al. | 345/600 |
| 2001/0018721 A1 * | 8/2001 | McKenna et al. | 710/126 |
| 2003/0126226 A1 * | 7/2003 | Ramey | 709/215 |
| 2003/0214506 A1 * | 11/2003 | Koselj et al. | 345/519 |
| 2004/0041832 A1 * | 3/2004 | Nguyen et al. | 345/736 |
| 2004/0117318 A1 * | 6/2004 | Grawrock | 705/66 |
| 2006/0082591 A1 * | 4/2006 | Emerson et al. | 345/602 |

OTHER PUBLICATIONS

IBM Personal System/2 and Personal Computer BIOS Interface Technical Reference, Second Edition (May 1988), pp. 2-11-2-45.

* cited by examiner

| | 0 | 1 | 2 | 3 | 4 | ••• | 23 | 24 |
|---|---|---|---|---|---|---|---|---|
| 159 | A | A | A | A | A | | A | A |
| 158 | C | C | C | C | C | | C | C |
| 157 | A | A | A | A | A | | A | A |
| ⋮ | • • • | • • • | • • • | • • • | • • • | | • • • | • • • |
| 4 | C | C | C | C | C | | C | C |
| 3 | A | A | A | A | A | | A | A |
| 2 | C | C | C | C | C | | C | C |
| 1 | A | A | A | A | A | | A | A |
| 0 | C | C | C | C | C | | C | C |

METHOD, APPARATUS, AND COMPUTER-READABLE MEDIUM FOR UTILIZING AN ALTERNATE VIDEO BUFFER FOR CONSOLE REDIRECTION IN A HEADLESS COMPUTER SYSTEM

TECHNICAL FIELD

The present invention is related to the management of a remote computer system in a computer network. More particularly, the present invention is related to utilizing an alternate video buffer for screen data when performing console redirection on a computer system that is not equipped with a video display adapter.

BACKGROUND OF THE INVENTION

In many computing systems low level instruction code is used as an intermediary between the hardware components of the computing system and the operating software and other high level software executed on the computing system. This low level instruction code is known as the computer Basic Input and Output System ("BIOS"). The BIOS provides a set of software routines that allow high level software to interact with the hardware components of the computing system using standard calls.

The BIOS may also provide a number of other optional features that serve to enhance the capabilities of the computer system. One such feature provided by some BIOS manufacturers is a feature for redirecting the video output of a computer system to a remote computing device via a standard RS-232 serial port or via a network communications port. Keyboard input can also be received from the remote device and processed by the computer system as if it was generated by a locally connected keyboard. This feature, known as "serial redirection" or "console redirection," is commonly used on "headless" computer systems that do not include a video display adapter, video display, or keyboard.

Video display adapters commonly provide video display memory for buffering and generating the screen display. Video display adapters also typically provide an optional read only memory ("ROM") that implements functions exposed by the BIOS for reading and writing to the video display memory. Programs can access these functions, and thereby write to the display screen, through the use of an industry standard video services software interrupt.

In headless computer systems that are not equipped with a video display adapter, such as rack mounted server computers utilized in large-scale installations, there is no video display memory for buffering the display. There is also no optional ROM for implementing the functions for reading and writing to the display. Accordingly, when used with headless computer systems, programs that are coded to utilize a standard video services software interrupt to write to the display screen may be unable to write data to the display. Because these programs are unable to write to the display screen, the information generated by these programs may also not be redirected during the console redirection process. This can be frustrating for system administrators that expect data from all programs to be redirected even when utilized with computer systems not equipped with a video display adapter.

It is with respect to these considerations and others that the various embodiments of the present invention have been made.

SUMMARY OF THE INVENTION

In accordance with the present invention, the above and other problems are solved by providing methods, systems, and computer-readable media for utilizing an alternate video buffer for console redirection in a headless computer system. By utilizing the embodiments of the invention, output from programs that utilize standard video services software interrupts to write to a display screen can be redirected to a remote computing device even in the absence of a video display adapter.

According to one aspect of the invention, a method is provided for redirecting the display output of a computer system that is configured without a video display adapter. A console redirection facility is provided that redirects video text data from the computer system to another computing device connected via a standard RS-232 serial communications port or network communications port. The console redirection facility also receives keyboard input via the communications port and utilizes the keyboard input as if the input was made at a locally connected keyboard. The console redirection facility is provided by a computer BIOS.

According to the method, a buffer is created in the memory of the computer that is configured to store character and attribute data for a display of the computer. Because no video display adapter is present, no video display memory is available to store the buffer. Accordingly, the buffer is created in a main random access memory ("RAM") of the computer and may include one byte for storing a character at each position on a display screen and one byte for storing a character attribute for each position on a display screen. When a video services software interrupt is detected, such as when a program attempts to read or write the video display memory of a display adapter, the interrupt is trapped. A determination is then made as to whether a function associated with the interrupt is for writing to a video display memory. If the function is for writing to a video display memory, the contents of the buffer are updated with the character or attribute information specified by the function. Data representing the updated character or attribute is then redirected to the remote computing device.

According to other aspects of the invention, a determination may be made in response to the occurrence of a video services software interrupt as to whether a function associated with the interrupt is for reading from a video display memory. If a read function is encountered, character or attribute information is retrieved from the buffer at a specified location and is returned in response to the function call. In this manner, a buffer is maintained for the screen display that programs may read and write even in the absence of video display hardware.

According to another aspect of the invention, the memory address of the buffer may be made available to application programs. By directly utilizing the address of the buffer and the appropriate offset to a desired character or attribute position, application programs may read and write the contents of the buffer directly without generating a video services software interrupt. This allows applications configured to access the buffer directly to redirect their output without incurring the overhead associated with a video services software interrupt.

According to another aspect of the invention, a computer-readable medium is provided having computer-executable instructions stored thereon. When executed by a computer, the instructions cause the computer to create a buffer in a memory of the computer configured to store character and attribute information for a display of the computer. The buffer may comprise one byte for each character and one byte for an attribute value for each character. The instructions also cause the computer to detect the occurrence of a video services software interrupt. In response to detecting the occurrence of an interrupt, the instructions are operative to cause the computer to determine whether a function associated with the interrupt is for writing to a video display memory on a video display adapter. If the function is for writing to a video display memory, the contents of the buffer are updated with character or attribute information specified by the function. The character or attribute information specified by the function is also encoded and redirected to a remote computing device.

According to other aspects of the invention, the computer-executable instructions are further operative to cause the computer to determine whether the function associated with the interrupt is for reading from a video display memory. If the function is for reading, the computer-executable instructions are operative to retrieve from the buffer character or attribute information specified by the function and to return the retrieved information as a response to the function call.

According to other aspects of the invention, the computer-executable instructions may be further operative to create a buffer for video display data even when a video display adapter is present. The buffer may be utilized to easily determine the characters or attributes that have changed within the display. In this manner, only the changed characters or attributes may be redirected. According to this aspect of the invention, the computer-executable instructions are operative to determine whether a display adapter is present in the computer. If a display adapter is present, the computer-executable instructions are operable when executed to update the contents of the buffer with the character or attribute information specified by a write function, to call an interrupt handler provided by the display adapter to write the character or attribute information to a display memory provided by the display adapter, and to encode and transmit the character or attribute information to a remote computing device. By maintaining a buffer in this manner, the changed character or attribute data can be quickly identified and transmitted to the remote computer.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE PREFERRED EMBODIMENT

Embodiments of the present invention provide methods, systems, apparatus, and computer-readable media for utilizing an alternate video buffer for console redirection in a headless computer system. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Figure 1:
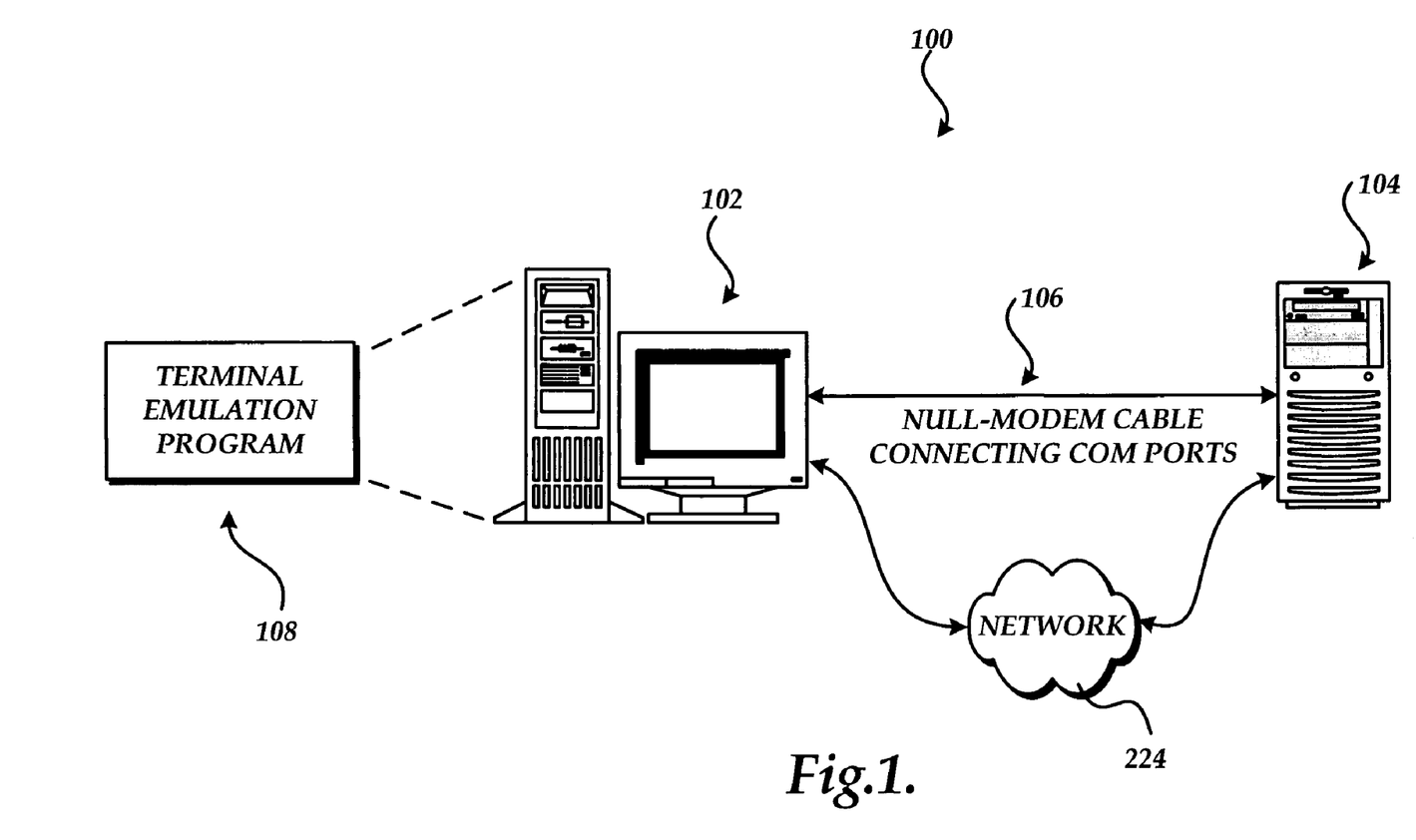
FIG. 1 is a computer system diagram showing an illustrative operating environment for the various embodiments of the present invention.

FIG. 1 and the following discussion are intended to provide a brief, general description of a suitable computing environment in which the invention may be implemented. While the invention will be described in the general context of program modules that execute in conjunction with the execution of a computer BIOS, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative system 100 for practicing the various embodiments of the invention will be described. The system 100 includes a client computer 102 operative to execute one or more application programs, such as the terminal emulation program 108 for connecting to and communicating with a server computer 104 through a serial port connection 106. As is known by those skilled in the art, terminal emulation programs enable a computer system to connect to and communicate with other computer systems.

According to embodiments of the invention, the terminal emulation program 108 is operative to emulate a terminal that is compatible with the VT-100 terminal protocol developed by DIGITAL EQUIPMENT CORPORATION. The terminal emulation program 108 may also be operative to emulate other types of terminal protocols from other manufacturers and specified by other standards bodies. For instance, according to embodiments of the invention, the terminal emulation program 108 may be capable of supporting the ANSI standard for communicating ANSI standard text data with remote computers over a network. Of course, it will be appreciated that the terminal emulation program 108 may emulate other terminals. According to embodiments of the invention, the terminal emulation program may comprise the HYPERTERMINAL program from MICROSOFT CORPORATION of Redmond, Wash., or the MINICOM terminal emulation package for computers based on the LINUX operating system.

As illustrated in FIG. 1, the client computer 102 and the server computer 104 may be connected via a serial port connection 106. In particular, a null-modem cable is connected to a serial communication port of the client computer 102 and to a serial communication port of the server computer 104. It should be appreciated that other types of connections may be utilized to connect the client computer 102 and the server computer 104, including parallel port connections, network connections, such as the through the network 224, universal serial bus ("USB"), FIREWIRE, and other types of connections known to those skilled in the art.

When the serial port connection 106 is utilized, the communications ports of the client computer 102 and the server computer 104 must also be configured to communicate at a compatible baud rate, number of data bits, parity bits, and stop bits. For instance, the client computer 102 and the server computer 104 may be configured to communicate at 115200 baud, 8 data bits, no parity bits, and one stop bit. Other similar configurations may be utilized.

Once the client computer 102 and the server computer 104 have been connected via the serial port connection 106 and configured, the two computers are capable of communicating with one another. As will be described in greater detail below, the server computer 104 includes functionality for redirecting display screens to the client computer 102 and for receiving keyboard input from the client computer 102 as if it was generated at a keyboard connected directly to the server computer 104. Additional details regarding the operational specifics of this functionality are provided below.

Figure 2:
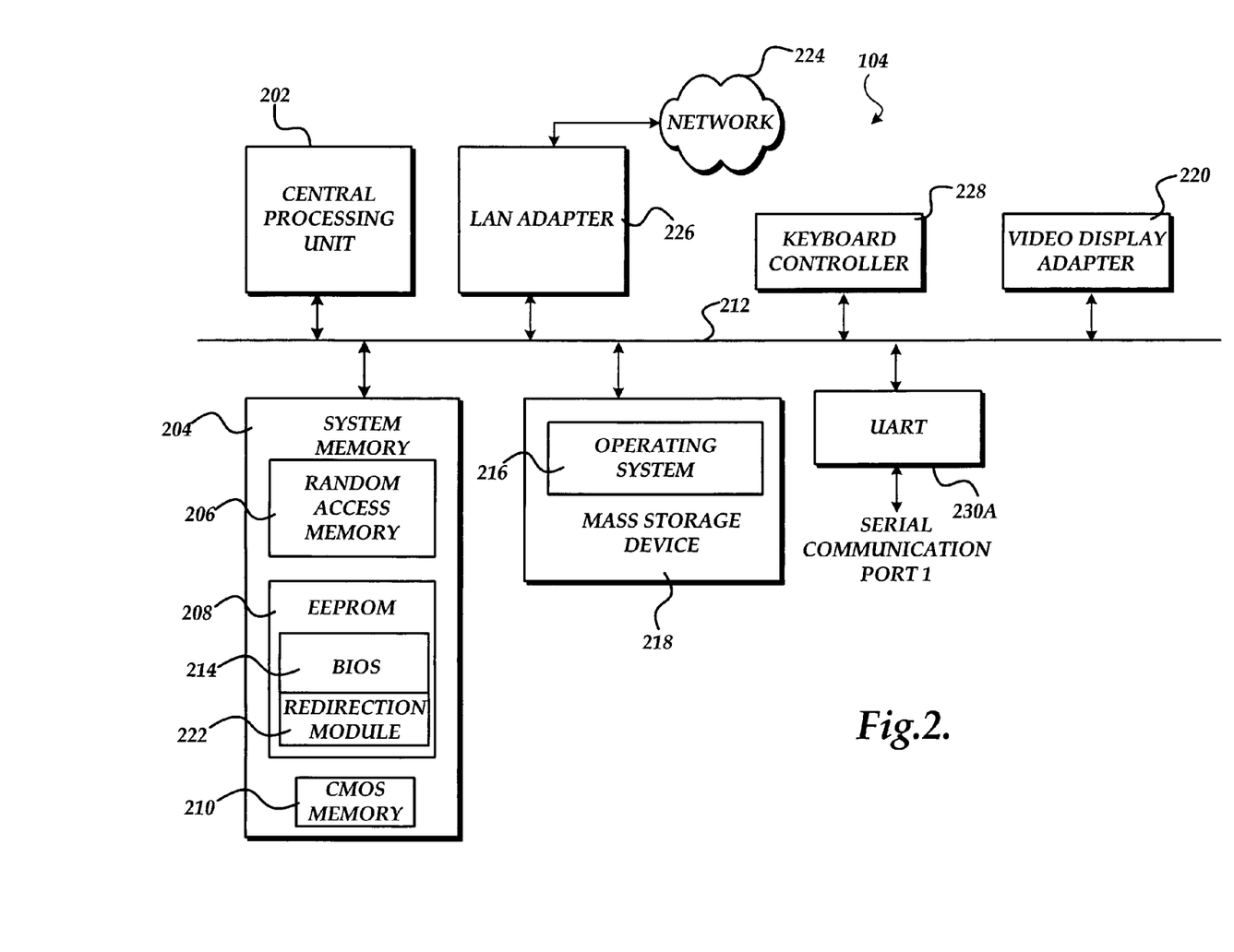
FIG. 2 is a computer architecture diagram that illustrates the various components of a headless server computer utilized in the embodiments of the invention.

Turning now to FIG. 2, an illustrative computer architecture for a server computer 104 utilized in the various embodiments of the invention will be described. The computer architecture shown in FIG. 2 illustrates a conventional server computer, including a CPU 202, a system memory 204, including a RAM 206, an EEPROM 208 and a CMOS memory 210, and a system bus 212 that couples the memory to the CPU 202. A BIOS 214 containing the basic routines that help to transfer information between elements within the computer, such as during startup, is stored in the EEPROM 208. The BIOS 214 is executed by the CPU 202 when the computer 104 is powered on.

The BIOS 214 performs a number of functions at startup of the computer 104, including discovering and initializing the RAM 206, copying the contents of the BIOS 214 to the RAM 206, executing the BIOS 214 to perform a power on self-test ("POST") routine, and to pass control of the computer 104 to an operating system 216. Once the operating system 216 has been loaded, aspects of the BIOS 214 may be utilized to manage data flow between the operating system 216 and devices attached to the computer 104, such as a mass storage device 218, a video display adapter 220, a keyboard controller 228, a mouse and a printer. The CMOS memory 210 is a battery-backed memory device that is used by the BIOS 214 to store setting information for the computer 104, including information regarding whether a console redirection facility has been enabled and, if so, the communication port to which the console should be redirected. This information is typically specified by a user through the use of a BIOS setup menu provided by the BIOS 214 and accessible at boot time.

As known to those skilled in the art, the BIOS 214 is an integral part of the computer 104 and is typically shipped with the computer 104 from the manufacturer. The BIOS 214 is made accessible to the CPU 202 on an EEPROM device 208. When the computer 104 is powered on, the CPU 202 passes control to the BIOS 214, which is always located at the same place in the memory architecture of the computer 104. By utilizing the BIOS 214, the operating system 216 and the applications that it executes are freed from having to understand exact details, such as hardware addresses, about input/output devices attached to the computer 104.

As described in greater detail herein, the BIOS 214 includes program code for redirecting screen displays of the computer 104 to a remote terminal via a communications port. In particular, the BIOS 214 also includes a redirection module 222 which is an executable program module containing program code for redirecting video text data from the server computer 104 to the client computer 102, or other type of terminal. In order to redirect video text data and provide other types of serial communications, the computer 104 includes a universal asynchronous receiver/transmitter ("UART") 230A or a LAN adapter 226 that provides the hardware necessary for communicating with the remote computer.

The server computer 104 further includes a mass storage device 218 for storing an operating system 216, application programs, and other program modules. The mass storage device 218 is connected to the CPU 202 through a mass storage controller (not shown) connected to the bus 212. The mass storage device 218 and its associated computer-readable media, provide non-volatile storage for the server computer 104. Although the description of computer-readable media contained herein refers to a mass storage device, such as a hard disk or CD-ROM drive, it should be appreciated by those skilled in the art that computer-readable media can be any available media that can be accessed by the server computer 104.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the server computer 104.

According to various embodiments of the invention, the server computer 104 may operate in a networked environment using logical connections to remote computers through a network 224, such as the Internet. The computer 104 may connect to the network 224 through a network interface unit 226 connected to the bus 212. It should be appreciated that the network interface unit 226 may also be utilized to connect to other types of networks and remote computer systems. The computer 104 may also include a keyboard controller 228 for receiving input from a keyboard and a video display adapter 220 for providing output to a display screen. In the various embodiments of the invention described herein, it is not necessary for a video display adapter 220, a keyboard, or a display screen to be connected to the server computer 104.

According to embodiments of the invention, the video display adapter 220 and the BIOS 214 are operative to provide a number of alphanumeric display modes. In each of the alphanumeric display modes, every display character position is defined by two bytes in a display memory buffer provided by the video display adapter 220. In particular, one byte is typically provided that represents the character code corresponding to the character located at the particular position on the display. Another byte is provided that corresponds to the attribute for the character. By setting the various bits of the attribute byte, the color of the character may be changed, the character may be set to blink, may be displayed as underlined, and other aspects of the manner in which the character is displayed may be modified. Because each character position requires two bytes, each page of a display that is 80 characters wide by 25 characters down requires 4000 bytes of read/write memory. It should be appreciated that multiple pages may be provided.

For IBM-compatible computer systems, the first page of the display memory buffer for color display is located at memory address B8000h. Additional pages are located in the range between B8000h and BFFFh. In order to read and write the display memory, programs executing on the server computer 104 may access the memory buffer directly. Alternatively, programs may utilize a standard video services software interrupt to read and write to the display memory.

In IBM-compatible computer systems, the standard video services software interrupt utilized to read and write the display memory is referred to as interrupt 10h ("INT 10h"). INT 10h exposes a number of functions for setting the video mode ("00h"), setting the cursor type ("01h"), setting the cursor position ("02h"), reading the cursor position ("03h"), reading the attribute or character at the current cursor position ("08h"), writing the attribute or character at the current cursor position ("09h"), writing a character at the current cursor position ("0Ah"), write teletype at the active page ("0Eh"), to write a string ("13h"), and to perform other functions. As will be described in greater detail below, the redirection module 222 registers to handle the INT 10h interrupt and its associated functions mentioned above. The redirection module 222 also maintains a video buffer in the memory 206 of the computer 104. When programs, such as the operating system 216 or an application program, attempt to write to the display screen utilizing INT 10h function calls, the redirection module traps the interrupt. If a write function call is received, the redirection module 222 updates the buffer and transmits the written character to the remote computer system. If a read function call is received, the redirection module 222 reads the appropriate character from the buffer and responds to the interrupt with the read data. In this manner, INT 10h function calls made by the operating system 216 or an application program will continue to function even when a video display adapter 220 is not physically present in the computer 104. Additional details regarding this process will be described below with respect to FIGS. 3-6.

Figure 3:
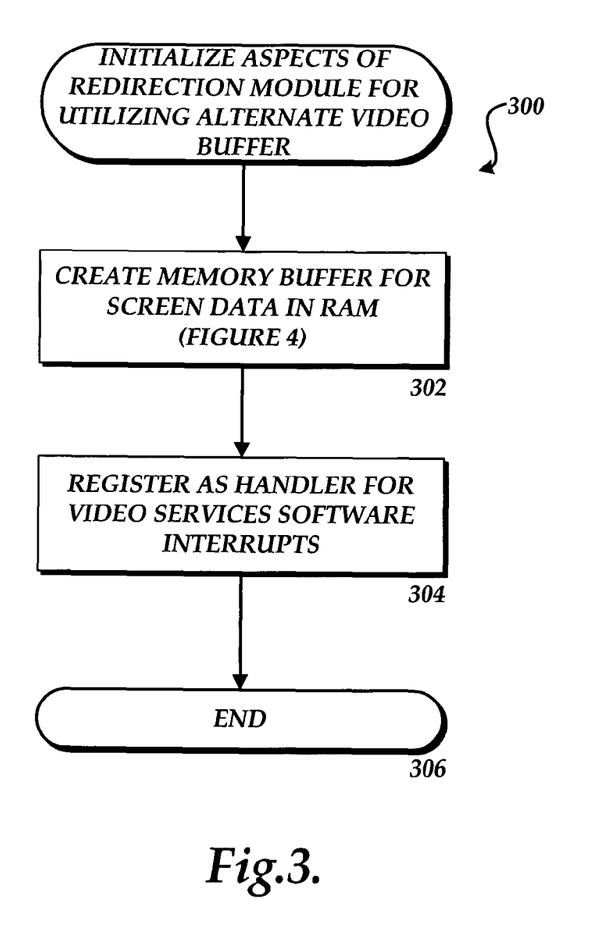
FIG. 3 is a flow diagram illustrating an exemplary process for initializing aspects of a redirection module for utilizing an alternate video buffer in one embodiment of the invention.

Referring now to FIG. 3, an illustrative routine 300 will be described for initializing aspects of the redirection module 222 for utilizing an alternate video buffer in a display redirection process. FIG. 3 shows illustrative logical operations in the environment described above with reference to FIGS. 1 and 2. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 300 begins at operation 302, where the redirection module 222 creates a memory buffer in the RAM 206 for storing screen data. The memory buffer is configured to store character and attribute data for a display screen. The buffer is utilized by the redirection module 222 to process INT 10h interrupts when no video display adapter 220 is present in the computer 104. Additional details regarding the construction and configuration of the memory buffer will be provided below with respect to FIG. 4. From operation 302, the routine 300 continues to operation 304.

At operation 304, the redirection module 222 registers as a handler for standard video services software interrupts, such as the INT 10h in IBM PC-compatible computer systems. As known to those skilled in the art, the redirection module 222 may register as a handler for the video services interrupt by modifying the contents of an interrupt vector table provided by the computer 104. The interrupt vector table is a table in low memory that contains the segmented address of the interrupt handling subroutine in the redirection module 222. Each interrupt number is associated with a specific interrupt vector. The interrupt vector table is typically supervised by the BIOS 214 and the operating system 216. Once the redirection module 222 has registered as a handler for video services software interrupts, the redirection module 222 is ready to begin processing of read and write function calls for writing to the display memory. Additional details regarding the processing of the read and write function calls will be provided below with respect to FIGS. 5 and 6. The routine 300 continues from operation 304 to operation 306, where it ends.

Figure 4:
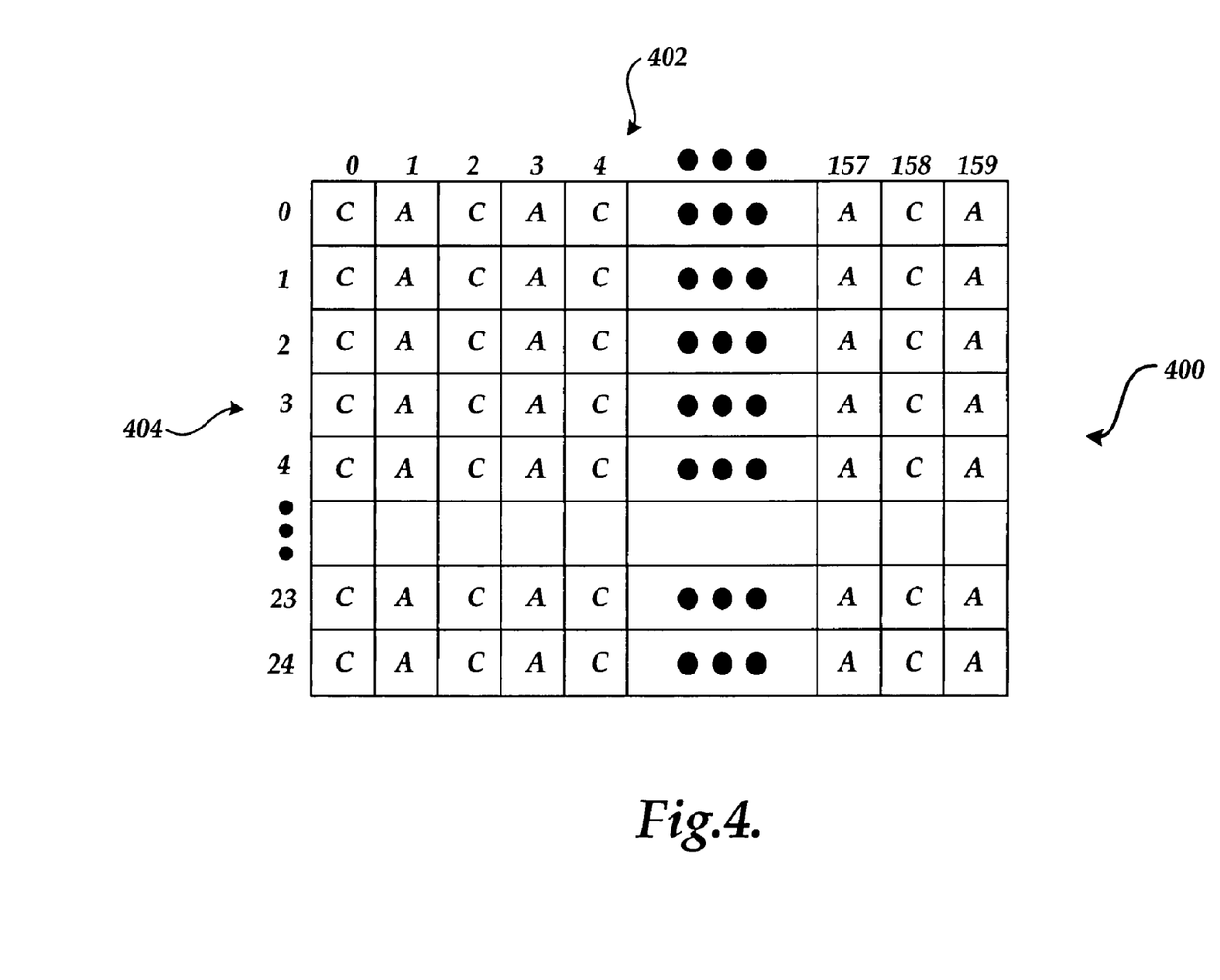
FIG. 4 is a memory diagram showing the arrangement of a memory buffer utilized in one embodiment of the invention.

Turning now to FIG. 4, a memory diagram showing the arrangement of a memory buffer utilized in one embodiment of the invention will be described. As discussed briefly above, the redirection module 222 creates a buffer 400 in the RAM 206. The buffer 400 is utilized by the redirection module 222 to store character and attribute information for a display screen that would typically be stored within memory accessible to a video display adapter 220. Because the video display adapter 220 may not be present in headless computer systems, it is necessary for the redirection module 222 to create its own buffer in a memory accessible to the redirection module 222.

As shown in FIG. 4, the contents of the buffer 400 are arranged logically according to the display mode for which the buffer 400 is utilized. For instance, the illustrative buffer 400 shown in FIG. 4 is arranged to store character and attribute information for a text display mode having 80 columns and 25 lines. Accordingly, the buffer is logically arranged into rows 404 that include one byte for storing a code corresponding to a character at each position (notated by a "C" in FIG. 4) and one byte for storing attribute information for the character (notated by an "A" in FIG. 4). Rows 404 are present for each line in the display mode.

Utilizing the example buffer 400 shown in FIG. 4, it should be appreciated that 4000 bytes (4K) of memory is required. However, it should be appreciated that other amounts of memory may be necessary to create a buffer in the RAM 206 for different video modes. It should also be appreciated that FIG. 4 illustrates the logical manner the memory may be arranged and that the actual physical arrangement of the buffer 400 in the memory 206 may be different. The logical arrangement may also be different in the various embodiments of the invention.

Figure 5:
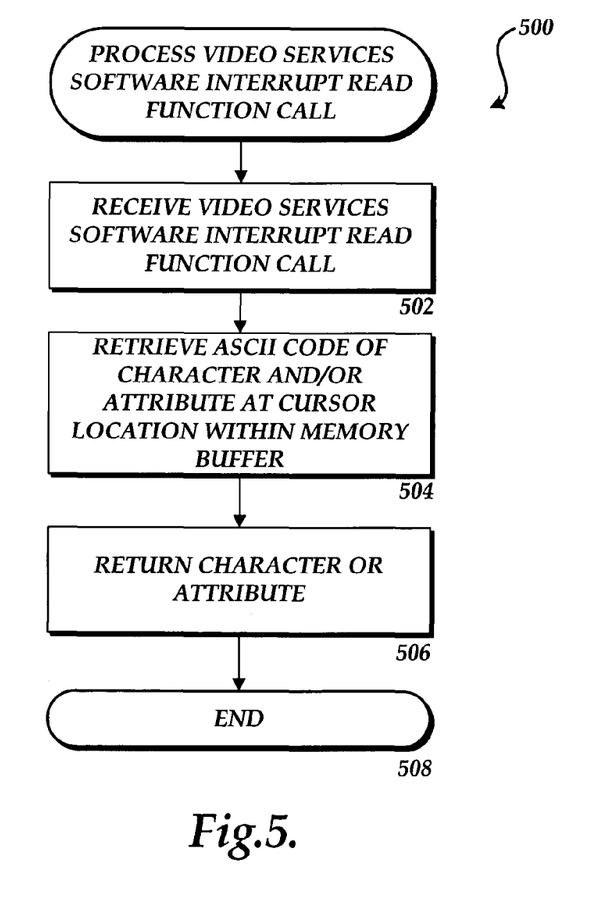
FIGS. 5-6 are flow diagrams showing illustrative routines for processing video services software interrupt read and write function calls, respectively.

Referring now to FIG. 5, an illustrative routine 500 will be described for processing a video services software interrupt read function call. The routine 500 begins at operation 502, where the redirection module 222 receives a video services software interrupt read function call. In an IBM PC-compatible computer system, this is referred to as function 08h and may be utilized to read either character or attribute information at the current cursor position. It should be appreciated that the redirection module 222 may also respond to function 02h calls to set the cursor position. Data may be maintained by the redirection module 222 identifying the current cursor position.

In response to receiving a video services software interrupt read function call, the routine 500 continues to operation 504, where the redirection module 222 retrieves the ASCII code of the character at the current cursor location within the memory buffer 400. Alternatively, if the function call is for reading an attribute, the redirection module 222 retrieves from the memory buffer 400 the requested attribute. The routine 500 then continues from operation 504 to operation 506.

At operation 506, the redirection module 222 returns the retrieved character or attribute information as a response to the function call. In this manner, an application program or the operating system 216 may read from a video buffer utilizing standard interrupt function calls even in the absence of a hardware video display adapter 220. From operation 506, the routine 500 continues to operation 508, where it ends.

Figure 6:
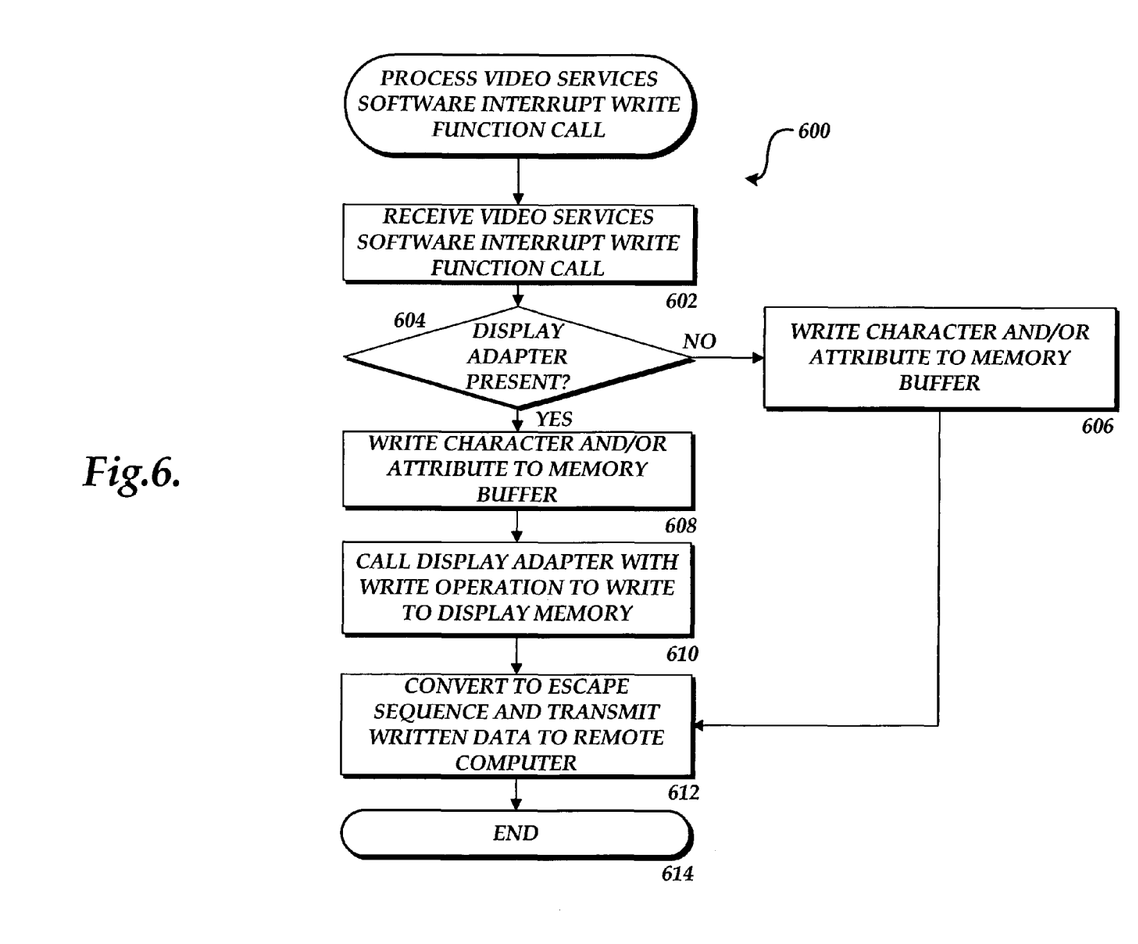

Turning now to FIG. 6, an illustrative routine 600 will be described for processing a video services software interrupt write function call. The routine 600 begins at operation 602, where the redirection module 222 receives a video services software interrupt write function call. In an IBM PC-compatible computer system, this may be performed through function calls 09h, 0Ah, 0Eh, and 13h. These functions may be utilized to write either character or attribute information at the current cursor position. From operation 602, the routine 600 continues to operation 604.

At operation 604, a determination is made as to whether a video display adapter 220 is present in the computer 104. If no video display adapter 220 is present, the routine 600 branches to operation 606, where the redirection module 222 writes the character or attribute information specified by the function call to the buffer 400. From operation 606, the routine 600 continues to operation 612, described below.

If, at operation 604, it is determined that a video display adapter 220 is present in the computer 104, the routine 600 continues to operation 608. At operation 608, the redirection module 222 writes the character or attribute information specified by the function call to the buffer 400. The routine 600 then continues to operation 610, where the redirection module 610 calls an interrupt handler provided by the video display adapter 220 to write the character or attribute information to a display memory provided by the video display adapter 220. In this manner, both the buffer 400 and the display memory provided by the video display adapter 220 are updated. The buffer 400 may be utilized by the redirection module 222 even in the presence of a video display adapter 220 to easily identify data that has changed on the display screen for transmission to the remote computer.

From operations 606 and 610, the routine 600 continues to operation 612. At operation 612, the redirection module 222 converts the character or attribute data specified by the write function to an escape sequence appropriate for transmission to and display by the terminal emulation program 108. Once the character or attribute data has been converted, the redirection module 222 transmits the data to the computer 102 for display. The routine 600 then continues to operation 614, where it ends.

It should be appreciated that, according to embodiments of the invention, the address of the memory buffer 400 may be provided to the operating system 216 or an application program. Utilizing this address, the operating system 216 or application program can read and write directly to the memory buffer 400. In this manner, it is not required to utilize a video services software interrupt to read and write the buffer 400. Accordingly, the processing overhead associate with interrupts may be avoided.

It will be appreciated that embodiments of the present invention provide methods, systems, apparatus, and computer-readable media for utilizing an alternate video buffer for console redirection in a headless computer system. Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:

1. A non-transitory computer storage medium having computer-executable instructions stored thereon which, when executed by a computer, will cause the computer to:
   create a buffer in a memory of the computer, the buffer configured to store character and attribute information for a display screen and having an address distinct from that of any memory provided by a display adapter;
   register a handler within an interrupt vector table provided by the computer for handling video services software interrupts;
   trap an occurrence of the video services software interrupt;
   in response to trapping the occurrence of the video services software interrupt, determine whether a function associated with the interrupt is for writing to a video display memory;
   in response to determining that the function associated with the interrupt is for writing to a video display memory, detect the presence of a display adapter in the computer;
   in response to detecting the presence of the display adapter, update the contents of the buffer with character or attribute information specified by the function and call an interrupt handler provided by the display adapter to write the character or attribute information to the display memory provided by the display adapter;
   in response to not detecting the presence of the display adapter, update the contents of the buffer with character or attribute information specified by the function; and
   encode and transmit the character or attribute information written to the buffer to a remote computing device.

2. The non-transitory computer storage medium of claim 1, comprising further computer-executable instructions which, when executed by the computer, will cause the computer to:

in response to trapping the occurrence of the video services software interrupt, determine whether a function associated with the interrupt is for reading from a video display memory; and in response to determining that the function associated with the interrupt is for reading from a video display memory, retrieve from the buffer character or attribute information specified by the function, and return the retrieved character or attribute information as a response to the function.

3. The non-transitory computer storage medium of claim 1, comprising further computer-executable instructions which, when executed by the computer, will cause the computer to permit an operating system or a program to read and write directly to the buffer without generating an interrupt.

4. The non-transitory computer storage medium of claim 3, comprising further computer-executable instructions which, when executed by the computer, will cause the computer to provide an address of the buffer to the operating system or program.

5. The non-transitory computer storage medium of claim 1, wherein the buffer comprises one byte for storing a character at each position on the display screen and one byte for storing an attribute for the character at each position on the display screen.

6. A computer-implemented method for redirecting a display of a computer system, the method comprising:

creating a buffer in a memory of the computer system, the buffer configured to store character and attribute information for the display and having an address distinct from that of any memory provided by a display adapter;

registering a handler within an interrupt vector table of the computer system for handling video services software interrupts;

trapping an occurrence of the video services software interrupt in the computer system;

in response to trapping the occurrence of the video services software interrupt, determining whether a function associated with the interrupt is for writing to a video display memory;

in response to determining that the function associated with the interrupt is for writing to a video display memory, detecting the presence of a display adapter in the computer system;

in response to detecting the presence of the display adapter, updating the contents of the buffer with character or attribute information specified by the function and calling an interrupt handler provided by the display adapter to write the character or attribute information to the display memory provided by the display adapter;

in response to not detecting the presence of the display adapter, updating the contents of the buffer with character or attribute information specified by the function; and converting the data representing the character or attribute information written to the buffer to an escape sequence appropriate for display by a terminal emulation program and transmitting the escape sequence to a remote computing device.

7. The method of claim 6, further comprising:

in response to trapping the occurrence of the video services software interrupt, determining whether a function associated with the interrupt is for reading from a video display memory; and in response to determining that the function associated with the interrupt is for reading from a video display memory, retrieving from the buffer character or attribute information specified by the function, and returning the retrieved character or attribute information as a response to the function.

8. The method of claim 6, further comprising providing an address of the buffer to an operating system or a program executing in the computer system in order that the operating system or program can read and write directly to the buffer without generating an interrupt.

9. The method of claim 6, wherein the buffer comprises one byte for storing a character at each position on the display screen and one byte for storing an attribute for the character at each position on the display screen.

10. A computer system operable to redirect a display to a remote computing device, the system comprising:

a first memory operable to store a buffer representing character and attribute information for the display on the remote computing device, the first memory having an address distinct from that of memory provided by a display adapter; a second memory provided by a display adapter present in the computer system operable to store a display memory representing character and attribute information for the display on the computer system; and a third memory storing a BIOS program operative to:
create the buffer,
trap a video services software interrupt,
determine whether a function associated with the interrupt is for writing to a video display memory,
in response to determining that the function associated with the interrupt is for writing to a video display memory, detect the presence of the display adapter in the computer system,
in response to detecting the presence of the display adapter, update the contents of the buffer with character or attribute information specified by the function and call an interrupt handler provided by the display adapter to write the character or attribute information to the display memory, and
convert the data representing the character or attribute information written to the buffer to an escape sequence appropriate for display by a terminal emulation program and transmit the escape sequence to the remote computing device.

11. The computer system of claim 10, wherein the BIOS program is further operative to:
determine whether the function is for reading from a video display memory; and
in response to determining that the function associated with the interrupt is for reading from a video display memory, retrieve from the buffer character or attribute information specified by the function, and return the retrieved character or attribute information as a response to the function.

12. The computer system of claim 10, wherein the BIOS program is further operative to provide an address of the buffer to an operating system or a program executing in the computer system in order that the operating system or program may read and write directly to the buffer without generating an interrupt.

13. The computer system of claim 10, wherein the buffer comprises one byte for storing a character at each position on the display screen and one byte for storing an attribute for the character at each position on the display screen.

14. The computer system of claim 10 wherein the BIOS program is further operative to register a handler within an interrupt vector table provided by the computer system for handling video services software interrupts.

* * * * *